United States Patent Office 2,784,215
Patented Mar. 5, 1957

2,784,215

MONOMERIC ESTERS OF α-CYANOACRYLIC ACID AND THEIR PREPARATION

Frederick B. Joyner, Kingsport, Tenn., assignor to Eastman Kodak Company, Rochester, N. Y., a corporation of New Jersey No Drawing. Application April 7, 1954, Serial No. 421,696

14 Claims. (Cl. 260—465.4)

This invention relates to substituted alkyl esters of α-cyanoacrylic acid and is particularly concerned with monomeric alkoxyalkyl and thioalkoxyalkyl esters of α-cyanoacrylic acid which are useful as adhesives and as modifiers for alkyl α-cyanoacrylate adhesives, and to the preparation of such monomers.

The alkyl esters of α-cyanoacrylic acid have been found to possess excellent utility as adhesive compositions requiring no catalyst or heat during the bonding operation. These materials are useful in bonding a great variety of materials together to form laminated articles which strongly resist fracture of the adhesive bond. The use of such alkyl esters of α-cyanoacrylic acid as adhesives is described in the copending application of Harry W. Coover, Jr., Serial No. 318,325, filed November 1, 1952. The bonds formed with such alkyl α-cyanoacrylates, however, tend to become somewhat brittle upon ageing and also possess little flexibility. In some cases, it is desirable to have adhesive bonds which possess some degree of flexibility in order that the bond will not be fractured by sudden shocks. This is particularly true when bonding rigid materials such as glass and metals.

It is accordingly an object of this invention to provide new monomers which are suitable for use in adhesive compositions and which form adhesive bonds with improved ageing and flexibility characteristics.

Another object of the invention is to prepare monomeric alkoxyalkyl and thioalkoxyalkyl esters of α-cyanoacrylic acid which overcome the disadvantages inherent in the unsubstituted alkyl α-cyanoacrylates.

Another object of the invention is to provide new monomeric adhesives which can be used alone or in conjunction with alkyl α-cyanoacrylates in the bonding of a great variety of similar or dissimilar materials without the use of heat or catalyst during the bonding operation.

Another object of the invention is to provide laminated articles consisting of two or more elements bonded together with a flexible bond of high strength and not subject to fracture upon ageing or upon being subjected to sudden shocks.

A further object of the invention is to provide new monomeric derivatives of α-cyanoacrylic acid which produce bond-forming polymers by merely being spread in a thin film, and which can be readily stored for prolonged periods of time in the monomeric form without undergoing autopolymerization.

Other objects will be apparent from the description and claims which follow.

These and other objects are attained by means of this invention as described more fully hereinafter with particular reference to certain preferred embodiments thereof.

The monomers embodying this invention are alkoxyalkyl or thioalkoxyalkyl esters of α-cyanoacrylic acid and have the structure

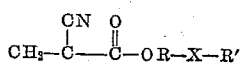

in which R is an aliphatic divalent hydrocarbon radical of from 1 to 8 carbon atoms, such as, for example, ethylene, propylene, trimethylene, 1,2-butylene, 2,3-butylene, tetramethylene, or the like; R' is a straight or branched-chain alkyl radical of from 1 to 8 carbon atoms as typified by methyl, ethyl, propyl, isopropyl, isobutyl, sec-butyl, amyl, hexyl, 2-ethylhexyl, and similar alkyl radicals; and X is either oxygen or sulfur. Any of these monomeric materials can be used in practicing the invention and are entirely suitable for bonding together such materials as glass, metal, wood, textiles, rubber, plastics and similar materials into laminated articles of great strength. The bonds thereby formed have unusual ageing characteristics and possess an excellent degree of flexibility whereby the bonds are not subject to fracture upon sudden shock.

The monomers of this invention are prepared by the base-catalyzed condensation of formaldehyde or a polymer of formaldehyde with an alkoxyalkyl or thioalkoxyalkyl ester of cyanoacetic acid to give resinous materials consisting of the corresponding α-cyanoacrylic esters in the form of partial polymers, and depolymerizing such polymers to the desired monomer by pyrolysis, as described more fully hereinafter. The esters of cyanoacetic acid which are employed in practicing this invention can be readily prepared by the direct esterification of cyanoacetic acid, preferably in the presence of an acid catalyst such as p-toluenesulfonic acid or the like, with alcohols of the formula

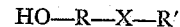

in which R, R' and X have the values assigned hereinabove. The resulting alkoxyalkyl or thioalkoxyalkyl esters of cyanoacetic acid are thereafter condensed with monomeric or polymeric formaldehyde under basic conditions. The condensation can be carried out in aqueous or in nonaqueous media. When the condensation is effected in aqueous media, an aqueous solution of formaldehyde can be used. When the condensation is effected in nonaqueous media, anhydrous formaldehyde such as paraformaldehyde is desirably employed. The condensation is catalyzed by means of basic catalysts such as piperidine, trimethylamine, sodium methoxide, sodium hydroxide, and the like. When the reaction is carried out in an aqueous medium, the preferred catalysts are the strong organic bases such as piperidine and trimethylamine. The alkali alcoholates, as well as the organic bases, can be used in nonaqueous medium such as alcohols and ethers. The preferred alkali alcoholates can be produced by the reaction of sodium or potassium metal with the desired alcohol, and such alkali alcoholates are preferred from the economical standpoint, although the lithium alcoholates and the like can be employed with equally good results.

The reaction between the cyanoacetate and the formaldehyde proceeds readily under reflux to give high yields of a polymeric form of the α-cyanoacrylates. Although the condensation can be effected in aqueous media, it is preferred to effect the reaction in nonaqueous media such as in methyl alcohol, ethyl alcohol, isopropyl alcohol, diethyl ether, isopropyl ether, or the like, in order to facilitate the preparation of substantially anhydrous polymers which can be readily depolymerized to form the desired monomers. When the reaction is effected in nonaqueous media, a solvent which is capable of forming an azeotrope with the water evolved during the reaction is desirably included in the reaction mixture or added to the reaction mixture prior to the removal of the solvent from the system. Benzene is conveniently employed as the azeotrope-forming solvent, although any of the other well known solvents can be employed which exhibit this characteristic.

In order to facilitate the subsequent depolymerization, the polymeric α-cyanoacrylate which is formed by the condensation is desirably brought to a moisture content below about 0.4%. In the case of the polymers formed in aqueous media, it is usually necessary to dry the polymers for a considerable length of time in order to obtain the required low moisture content. When the condensation reaction is effected in nonaqueous media, however, the water formed during the reaction can readily be distilled off azeotropically to give a crude polymeric product containing less than 0.4% water. Such polymeric α-cyanoacrylates can thereafter be directly depolymerized without further treatment. Since the polymeric cyanoacrylate containing such a low moisture content can be readily melted, the process is adaptable for continuous operation whereby the condensation reaction is run in a suitable reaction vessel, the solvent is removed by distillation, and the crude polymer is melted and flowed into a suitable depolymerization system.

The depolymerization is readily effected by heating the crude polymeric product at an elevated temperature under reduced pressure whereby monomeric vapors are evolved which can be condensed and collected in a suitable receiver. The polymeric alkoxyalkyl and thioalkoxyalkyl α-cyanoacrylates which are produced during the condensation are low melting resins or heavy viscous liquids. As a consequence, they are readily melted in the depolymerization vessel. The depolymerization can be effected by merely heating the molten mass of crude polymer, although best results are obtained when employing a tertiary ester of phosphoric acid such as triphenyl phosphate, tricresyl phosphate, trihexyl phosphate, or similar high boiling esters as depolymerization medium. By the use of such phosphate esters, the depolymerization conditions are considerably less stringent than when the depolymerization is effected on the molten polymer itself. Thus, the depolymerization can be effected at a temperature approaching the melting temperature of the polymer, or at temperature below 200° C. and in relatively short periods of time when employing a tertiary phosphate ester as depolymerization medium. This is especially desirable since the discoloration and decomposition of the polymer to form unwanted by-products is thereby minimized. The depolymerization is desirably effected by heating the polymer under vacuum in the presence of an acidic ionic-polymerization inhibitor which is preferably a material capable of reacting with hydroxyl-containing compounds such as water and alcohols. The preferred acidic ionic-polymerization inhibitors are phosphoric anhydride, polyphosphoric acid, or o-sulfobenzoic anhydride. Other similar materials exhibiting an acid reaction can be employed with less advantageous results, including such materials as antimony pentoxide and the like. The acidic polymerization inhibitor is mixed with the polymer in the depolymerization vessel for best results. Free radical polymerization inhibitors can also be used, including polyhydric phenols such as hydroquinone, catechol, and the like, nitrophenols such as p-nitrophenol, picric acid, and the like, and aromatic nitro compounds such as trinitrobenzene. Optimum results are obtained by introducing an acidic gaseous inhibitor into the depolymerization system whereby the gaseous inhibitor mixes with the monomeric vapors as they are evolved from the polymer. The preferred gaseous inhibitors are sulfur dioxide and nitric oxide, with sulfur dioxide being particularly desirable. A small amount of the gaseous inhibitor usually condenses with the monomeric vapors to give a monomeric product containing a stabilizing amount of the normally gaseous inhibitor. The receiving vessel for the monomer can also contain a polymerization inhibitor if desired, with hydroquinone being preferred.

The depolymerization is generally carried out at a temperature of from 160° to 260° C. and at a reduced pressure of less than 20 mm. Hg. It is preferred to carry out the depolymerization at the lowest possible pressure in order to facilitate the removal of the monomeric alkoxyalkyl or thioalkoxyalkyl ester of α-cyanoacrylic acid from the depolymerization vessel as rapidly as possible and thus prevent thermal repolymerization of the monomer. The exact time and temperature necessary for effecting the depolymerization will, of course, depend upon a number of variable factors, including the nature of the ester being depolymerized, the pressure employed, and similar variable factors. The monomer which is obtained from the depolymerization is generally pure, but in some cases it is desirable to effect further purification by redistillation under vacuum. The redistillation is generally carried out at a reduced pressure of less than 10 mm., and preferably below 3 mm., in the presence of a gaseous inhibitor exhibiting an acid reaction, desirably sulfur dioxide, an acidic ionic-polymerization inhibitor of the type used in the depolymerization, preferably phosphoric anhydride, and a free-radical polymerization inhibitor as described above, preferably hydroquinone. In general, the free-radical inhibitor is preferably employed in amounts of from 0.1 to 0.5% by weight based on the weight of monomer, although higher or lower concentrations can be used and are operable. The preferred amount of acidic ionic-polymerization inhibitor is about 1 to 2% of the weight of the monomer. The gaseous inhibitor, which is desirably sulfur dioxide, is introduced into the monomer vapors in an amount such that the distilled monomer will contain enough dissolved gaseous inhibitor to be stable at room temperature for several months. Usually, it is desirable to maintain the concentration of the sulfur dioxide within the range of 0.001 to 0.003% for optimum stability without impairing the adhesive activity of the monomer composition. When the monomeric product contains sulfur dioxide in an amount in excess of 0.003%, the excess sulfur dioxide can be removed by stirring the monomer for several minutes at room temperature under reduced pressure until the concentration of sulfur dioxide is reduced to within the desired concentration range. When the concentration of inhibitor is within the preferred range, the monomer is stable in bulk for prolonged periods of time at room temperature and yet will polymerize rapidly when spread in a thin film on the surface of an article to be bonded without the use of heat or a polymerization catalyst.

The alkoxyalkyl and thioalkoxyalkyl α-cyanoacrylate monomers of this invention can be used for forming strong bonds with a wide variety of materials. The bonds thus formed possess excellent ageing properties and are generally more rubbery or flexible than those formed using the unsubstituted alkyl α-cyanoacrylates. The monomers of this invention can be advantageously used in combination with the alkyl α-cyanoacrylates, such as methyl α-cyanoacrylate, to give mixed compositions which form high strength bonds having excellent ageing properties and having flexibility characteristics intermediate between the alkyl α-cyanoacrylate bonds and those obtained by use of the monomers of this invention alone.

When employing the compositions embodying this invention, the monomeric material is merely spread in a thin film on the surface of an element to be bonded, and the other element or elements to be used in forming the laminate are merely placed into contact with the monomeric film. The monomer polymerizes rapidly without the application of heat and without any polymerization catalyst within a few minutes to give a strongly adherent bond which is highly resistant to shear. Thus the compositions embodying this invention possess the anomalous characteristic of being stable for many weeks or months in bulk without showing substantial polymerization, and still polymerizing in a few seconds or a few minutes when spread into a thin film even though the film still contains the sulfur dioxide stabilizer. The adhesive compositions embodying this invention are characterized by a very low change in volume during polymerization. As a consequence they possess considerable utility in adhesive applications such as the use in dental cements and similar uses. They are also extremely useful for bonding sheets of glass together to form clear laminates of high strength. They can be used for bonding any of the common metals to themselves, to dissimilar metals, or to such materials as wood, rubber, glass, or textile materials. The monomers of this invention are usually of relatively low viscosity and hence readily wet the surface of the article to be bonded. In the case of porous materials, such as wood and the like, the adhesive composition penetrates into the surface and gives a waterproof bond which will not break before failure of the material itself. In some cases, it may be desirable to increase the viscosity of the adhesive compositions, and this can be readily done by including in the adhesive composition from 1 to 25% by weight of a viscosity regulator such as polymeric α-cyanoacrylate, cellulose ester, polymethacrylate, or similar thickening agent which is soluble in the adhesive composition. Since the adhesive compositions embodying this invention possess the requisite degree of flexibility, it is usually not necessary to include a plasticizer in the composition. Plasticizing materials can be employed, however, if desired. Similarly, other compounding ingredients such as fillers, coloring pigments and the like can, of course, be included in the compositions which are within the scope of the invention.

The invention is illustrated by the following examples of certain preferred embodiments thereof. It will be understood, however, that the examples are included merely for purposes of illustration, and it is not intended that the scope of the invention shall be limited thereby unless otherwise specifically indicated.

*Example 1*

A mixture of 572 parts of β-methoxyethyl cyanoacetate, 120 parts of paraformaldehyde, 4 parts sodium methoxide and 400 parts of methyl alcohol was gradually heated to reflux with constant stirring. A yellow, slightly viscous solution resulted after 2 hours at reflux. When this solution was cooled, a pasty mass resulted due to the separation of polymer. Sixty-two parts of tricresyl phosphate was added and most of the methanol was removed by distillation. Three hundred fifty parts of benzene was added to the mixture and the benzene-methanol-water azeotrope was removed by distillation. Most of the remaining benzene was removed by vacuum evaporation. At this point 25 parts of phosphoric anhydride and 21 parts of hydroquinone were added. The system was then placed under a reduced pressure corresponding to 3–4 mm. of Hg and sulfur dioxide gas was bled into the system through a capillary located above the surface of the distilland. The mixture was gradually heated to 160° C., whereupon depolymerization of the poly-β-methoxyethyl α-cyanoacrylate became appreciable. The entire depolymerization operation was carried out over a temperature range of 160–220° C. The monomer which formed during this process passed upward through a short column packed loosely with acid-washed copper tinsel and was collected in a Dry Ice-cooled receiver. The monomer was further purified by redistillation in vacuo in the presence of sulfur dioxide, 1.3 parts hydroquinone and 6.2 parts phosphoric anhydride. The yield of pure β-methoxyethyl α-cyanoacrylate boiling at 84–87° C. at 2.0 mm. pressure was 68%. This material contained 0.002% sulfur dioxide and was adhesive grade without further processing. Glass to glass bonds formed with this material had very good ageing characteristics.

*Example 2*

A mixture of 628 parts of β-ethoxyethyl cyanoacetate and 1 part piperidine was added in a rapid dropwise fashion over a 1-hour period to 325 parts aqueous formaldehyde (37%) preheated to 80° C. The temperature of the mixture was maintained at 80–90° C. throughout the addition operation and for 30 minutes thereafter. The yellow-colored polymer began to separate after about five-sixths of the cyanoacetic ester was added. The reaction mixture was poured while hot into a large evaporating dish. Most of the aqueous matter was removed by decantation, and the soft polymer was allowed to cool. The polymer was broken into small pieces in order to facilitate drying. This operation had to be repeated several times because of the tendency of the polymer chunks to fuse together. Complete drying was eventually accomplished in a vacuum desiccator over phosphoric anhydride. One hundred parts of the dried poly-β-ethoxyethyl α-cyanoacrylate was mixed with 90 parts tricresyl phosphate, 4 parts phosphoric anhydride and 3.5 parts hydroquinone. The system was placed under a reduced pressure of 3–4 mm. of Hg and sulfur dioxide was bled into the system through a capillary situated above the surface of the mixture. The mixture was gradually heated to 163° C., whereupon depolymerization of the polymer became noticeable with the distillation of monomer. The depolymerization was carried out over a temperature range of 163–238° C. The monomer which formed during this process passed upward through a short column packed loosely with acid-washed copper tinsel and was collected in a Dry Ice-cooled receiver containing 2 parts phosphoric anhydride. The yield of crude monomer was 63% of the theory. This monomer was purified by redistillation in vacuo in the presence of sulfur dioxide, 0.13 part hydroquinone and 0.63 part phosphoric anhydride. The overall yield of pure, sulfur dioxide-stabilized β-ethoxyethyl α-cyanoacrylate boiling at 92–94° C. at 2.0 mm. was 55.5%. This monomer, containing 0.001% sulfur dioxide, gave good bonding action when employed as an adhesive.

*Example 3*

The procedure of Example 1 was followed using 636 parts of β-thiomethoxyethyl cyanoacetate instead of β-methoxyethyl cyanoacetate and using 1 part piperidine instead of sodium methoxide. The yield of pure β-thiomethoxyethyl α-cyanoacrylate boiling at 79–84° C./0.10–0.15 mm. was 28%.

*Example 4*

The procedure of Example 2 was followed using β-methoxyisopropyl cyanoacetate in place of β-ethoxyethyl cyanoacetate. The yield of pure β-methoxyisopropyl α-cyanoacrylate boiling at 86–89° C./2 mm. was 58%. This material after agitation under 1 mm. pressure to reduce the sulfur dioxide content to 0.002% gave good bonding action when employed as an adhesive. The bonds thus formed showed good ageing characteristics.

*Example 5*

The procedure of Example 1 was followed using 684 parts of δ-methoxybutyl cyanoacetate in place of β-methoxyethyl cyanoacetate to give a fair yield of δ-methoxybutyl α-cyanoacrylate. Bonds with good ageing characteristics and flexibility were obtained with a 50–50 mixture of this material with adhesive grade methyl α-cyanoacrylate.

*Example 6*

As described herein and as illustrated in the examples, any of the alkoxyalkyl or thioalkoxyalkyl monomeric esters of α-cyanoacrylic acid can be prepared in accordance with this invention and employed as adhesive compositions. Thus, for example, employing the procedure of Example 1, 684 parts of β-isopropoxyethyl cyanoacetate were reacted with 120 parts of paraformaldehyde in the presence of a basic catalyst, and the resulting crude polymer was depolymerized as described to give monomeric β-isopropoxyethyl α-cyanoacrylate.

*Example 7*

Similar results were obtained employing γ-isobutoxypropyl cyanoacetate in the process of Example 1 instead of β-methoxyethyl cyanoacetate.

Thus by means of this invention a new and improved class of monomeric esters of α-cyanoacrylic acid is readily prepared, and such materials find increased utility in adhesive applications to give high strength bonds of improved ageing properties and flexibility characteristics. Although the use of these monomers in adhesive applications has been described particularly, it is obvious that such monomers can also be used in molding applications and the like in accordance with well known polymerization molding techniques.

Although the invention has been described in considerable detail with particular reference to certain preferred embodiments thereof, variations and modifications can be effected within the spirit and scope of the invention as described hereinabove and as defined in the appended claims.

I claim:

1. Monomeric α-cyanoacrylate which is autopolymerizable in thin film and which has the formula

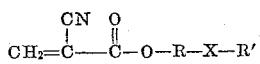

wherein R is an aliphatic divalent hydrocarbon radical of from 1 to 8 carbon atoms, R' is an alkyl group of from 1 to 8 carbon atoms, and X is a member of the group consisting of oxygen and sulfur.

2. Monomeric alkoxyalkyl ester of α-cyanoacrylic acid wherein the alkoxy and alkyl groups each contain from 1 to 8 carbon atoms, said ester being autopolymerizable in thin film.

3. Monomeric thioalkoxyalkyl ester of α-cyanoacrylic acid wherein the thioalkoxy and the alkyl groups each contain from 1 to 8 carbon atoms, said ester being autopolymerizable in thin film.

4. Monomeric autopolymerizable β-methoxyethyl α-cyanoacrylate.

5. Monomeric autopolymerizable β-ethoxyethyl α-cyanoacrylate.

6. Monomeric autopolymerizable β-thiomethoxyethyl α-cyanoacrylate.

7. Monomeric autopolymerizable β-methoxyisopropyl α-cyanoacrylate.

8. Monomeric autopolymerizable δ-methoxybutyl α-cyanoacrylate.

9. An adhesive composiontion which is autopolymerizable in thin film comprising monomeric α-cyanoacrylate of the formula

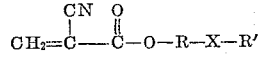

wherein R is an aliphatic divalent hydrocarbon radical of from 1 to 8 carbon atoms, R' is an alkyl group of from 1 to 8 carbon atoms, and X is a member of the group consisting of oxygen and sulfur, stabilized with 0.001 to 0.003% by weight of sulfur dioxide based on the weight of monomer in said composition.

10. An adhesive composition which is autopolymerizable in thin film comprising monomeric alkoxyalkyl ester of α-cyanoacrylic acid wherein each of the alkoxy and alkyl groups contains from 1 to 8 carbon atoms, stabilized with from 0.001% to 0.003% by weight of sulfur dioxide based on the weight of monomer in said composition.

11. An adhesive composition which is autopolymerizable in thin film comprising monomeric thioalkoxyalkyl α-cyanoacrylate wherein each of the thioalkoxy and alkyl groups contains from 1 to 8 carbon atoms, stabilized with from 0.001% to 0.003% by weight of sulfur dioxide based on the weight of α-cyanoacrylate monomer in said composition.

12. An adhesive composition comprising a mixture of monomeric alkyl α-cyanoacrylate wherein the alkyl group contains from 1 to 8 carbon atoms and monomeric α-cyanoacrylate of the formula

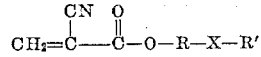

wherein R is an aliphatic divalent hydrocarbon radical of from 1 to 8 carbon atoms, R' is an alkyl group of from 1 to 8 carbon atoms, and X is a member of the group consisting of oxygen and sulfur, stabilized with from 0.001% to 0.003% by weight of sulfur dioxide based on the total weight of the monomers in said composition.

13. An adhesive composition which is autopolymerizable in thin film comprising a mixture of monomeric alkyl α-cyanoacrylate and monomeric alkoxyalkyl α-cyanoacrylate, wherein each alkoxy and alkyl group contains from 1 to 8 carbon atoms, stabilized with from 0.001% to 0.003% by weight of sulfur dioxide based on the total weight of monomers in said composition.

14. An adhesive composition which is autopolymerizable in thin film comprising a mixture of monomeric alkyl α-cyanoacrylate and monomeric thioalkoxyalkyl α-cyanoacrylate, wherein each of the thioalkoxy and alkyl groups contains from 1 to 8 carbon atoms, stabilized with from 0.001% to 0.003% by weight of sulfur dioxide based on the total weight of monomers in said composition.

References Cited in the file of this patent

UNITED STATES PATENTS

| | | |
|---|---|---|
| 2,439,081 | Dickey et al. | Apr. 6, 1948 |
| 2,467,927 | Ardis | Apr. 19, 1949 |
| 2,492,170 | Mast et al. | Dec. 27, 1949 |
| 2,535,827 | Ardis et al. | Dec. 26, 1950 |
| 2,535,861 | Miller | Dec. 26, 1950 |

OTHER REFERENCES

Frank et al.: J. A. C. S. vol. 68, pg. 908 (1946).